US010905096B2

(12) United States Patent
Mader

(10) Patent No.: US 10,905,096 B2
(45) Date of Patent: Feb. 2, 2021

(54) MILKING PARLOR COMPRISING A DRIVING ASSEMBLY FOR MILKING PARLOR GATES

(71) Applicant: GEA Farm Technologies GmbH, Bönen (DE)

(72) Inventor: Thomas Mader, Rheda-Wiedenbrück (DE)

(73) Assignee: GEA Farm Technologies GmbH, Bönen (DE)

( * ) Notice: Subject to any disclaimer, the term of this patent is extended or adjusted under 35 U.S.C. 154(b) by 109 days.

(21) Appl. No.: 16/080,194

(22) PCT Filed: Mar. 1, 2017

(86) PCT No.: PCT/EP2017/054721
§ 371 (c)(1),
(2) Date: Aug. 27, 2018

(87) PCT Pub. No.: WO2017/148988
PCT Pub. Date: Sep. 8, 2017

(65) Prior Publication Data
US 2019/0053464 A1 Feb. 21, 2019

(30) Foreign Application Priority Data
Mar. 1, 2016 (DE) .................... 20 2016 101 095 U

(51) Int. Cl.
*A01K 1/12* (2006.01)
*A01K 1/00* (2006.01)
(52) U.S. Cl.
CPC .............. *A01K 1/12* (2013.01); *A01K 1/0017* (2013.01)

(58) Field of Classification Search
CPC ...... A01K 1/12; A01K 1/0023; A01K 1/0017; A01K 15/04; A01K 1/0029; A01K 1/0209; A01K 1/0613; A01K 1/126
(Continued)

(56) References Cited

U.S. PATENT DOCUMENTS 3,792,686 A * 2/1974 Needham .................. A01K 1/12
119/14.03
4,715,321 A * 12/1987 Vandenberg ............. A01K 1/12
119/14.03
(Continued)

FOREIGN PATENT DOCUMENTS

EP 0451906 B1 6/1994
WO 0013496 A1 3/2000
(Continued)

OTHER PUBLICATIONS

International Search Report for International Application No. PCT/EP2017/054721, dated May 12, 2017, 2 pages.
(Continued)

*Primary Examiner* — Yvonne R Abbott-Lewis
(74) *Attorney, Agent, or Firm* — Smith Law Office; Jeffry W. Smith

(57) ABSTRACT

A milking parlor for milking dairy animals, having a pillar, a gate pillar provided with a pivoting entrance gate and a pivoting exit gate, and a bridge located on the pillar and the gate pillar; the milking parlor further includes a driving assembly that is located within the bridge and is coupled to the entrance gate and the exit gate.

11 Claims, 7 Drawing Sheets

(58) Field of Classification Search
USPC ............. 119/14.03, 840, 518, 524, 843, 908, 119/14.18
See application file for complete search history.

(56) References Cited

U.S. PATENT DOCUMENTS

| | | | |
|---|---|---|---|
| 4,763,605 A | 8/1988 | Braum | |
| 4,798,175 A * | 1/1989 | Townsend | A01K 11/006 119/51.02 |
| 4,813,379 A * | 3/1989 | Harmsen | A01K 1/0209 119/840 |
| 5,183,008 A * | 2/1993 | Carrano | A01K 1/0023 119/667 |
| 5,392,731 A | 2/1995 | Hoppman et al. | |
| 5,615,637 A | 4/1997 | Nelson | |
| 6,357,395 B1 | 3/2002 | Nilsson | |
| 7,677,205 B2 * | 3/2010 | Daniels | A01K 1/0613 119/519 |
| 7,679,517 B2 * | 3/2010 | Finlayson | A01K 11/008 340/573.1 |
| 7,836,855 B2 * | 11/2010 | Rausch | A01K 29/00 119/840 |
| 7,966,976 B2 * | 6/2011 | Thibault | A01K 1/0023 119/502 |
| 9,918,450 B2 | 3/2018 | Krone et al. | |
| 2003/0019433 A1 * | 1/2003 | Johannesson | A01K 1/126 119/14.03 |
| 2008/0163819 A1 * | 7/2008 | Sensenig | A01K 1/0017 119/14.03 |
| 2012/0272902 A1 * | 11/2012 | Hofman | A01J 7/04 119/14.02 |
| 2012/0272913 A1 * | 11/2012 | Hofman | A01J 5/00 119/14.03 |

FOREIGN PATENT DOCUMENTS

| | | |
|---|---|---|
| WO | 2015059439 | 4/2015 |
| WO | 2017148988 A1 | 9/2017 |

OTHER PUBLICATIONS

Search Report for DE 20 2016 101 095.0 dated Oct. 25, 2016, 4 pages.

* cited by examiner

MILKING PARLOR COMPRISING A DRIVING ASSEMBLY FOR MILKING PARLOR GATES

CROSS REFERENCE TO RELATED APPLICATION

This application is a national phase application under 35 U.S.C. 371 of PCT Application No. PCT/EP2017/054721, filed Mar. 1, 2017, the disclosure of which is incorporated by reference herein.

FIELD AND BACKGROUND OF THE INVENTION

The invention relates to a milking parlor with a driving assembly for milking parlor gates.

A milking parlor is used for the machine milking of milk-producing animals. Milk-producing animals are by way of example cows, buffalo, goats, sheep etc. A milking process can be automated by means of so-called milking robots. The milking parlor can be used as a single milking stand. However arrangements with two or more milking stands are possible.

Milking parlor components are by way of example milking units, power supply units, gates, grids, base plates and the like.

A milking unit is also called a place divider or side grid. The milking unit comprises the milking robot and associated drives.

WO 2013/135842 A1 describes a place divider of a milking parlor assembly for at least one milking stand for milking dairy animals. An arm mechanism is disclosed having a milking tool which is arranged in a parked position in the place divider.

As a result of increasing demands, more particularly high throughput numbers, for a continuous maintenance-free operation there is a constant need for improved milking parlors with reduced costs.

SUMMARY OF THE INVENTION

Against this background the object of the invention is to provide an improved milking parlor.

A milking parlor according to the invention for automatically milking dairy animals comprises a pillar, a gate pillar with a pivoting entrance gate and a pivoting exit gate, and a bridge mounted on the pillar and the gate pillar. The milking parlor comprises a driving assembly which is arranged inside the bridge and is coupled to the entrance gate and the exit gate.

A compact construction of the milking parlor is enabled in this way. The driving assembly is attached inside the bridge to a place above the milking parlor and above an animal to be milked in the milking parlor. All the components which are required for pivoting the gates, including the driving assembly, are thus located out of reach of the animal which is to be milked. This risk of injury to the animal being milked is thus considerably reduced.

At the same time the possibility of damaging the driving assembly with the associated components, eg through the animal to be milked passing through is also considerably reduced since the animal to be milked cannot reach them. This also enables the throughput to be increased. The drives are furthermore protected against dirt (when using compressed air cylinders: dirty piston rods, and for example also fly droppings, can lead to defective piston rod seals on the compressed air cylinder).

In one design the driving assembly has an entrance gate drive and an exit gate drive. The advantage of an individual adjustment of the entrance gate and exit gate is therefore achieved.

It is furthermore proposed that the entrance gate is coupled for pivotal movement to the entrance gate drive via a first gearing, and that the exit gate is coupled for pivotal movement to the exit gate drive via a second gearing. A compact structure can thus be possible.

In a further design the first gearing has a lever gearing with at least one lever, and the second gearing has a lever gearing with at least one lever. A simple effective gearing structure inside the bridge is thus achieved.

It is furthermore advantageous for a compact structure that the entrance gate is connected secured against rotation to a vertically mounted entrance gate shaft, and the exit gate is connected secured against rotation to a vertically mounted exit gate shaft. In this way the entrance gate shaft and the exit gate shaft can be mounted with their respective drive ends not only on the bridge but can also project into same in order to enable a simple coupling with the gearings.

Thus in a still further design it is advantageously proposed that the entrance gate shaft is connected secured against rotation to the at least one lever of the first gearing and that the exit gate shaft is connected secured against rotation to the at least one lever of the second gearing.

In another design, the entrance gate shaft is mounted on a vertical longitudinal side of a supporting body of the gate pillar, and the exit gate shaft is mounted on the other vertical longitudinal side of the supporting body of the gate pillar. The movable rotatable parts, namely the gate shafts, can thus be mounted in a narrow compact structure also substantially outside of reach of an animal to the milked.

For a particularly advantageous flat structure, the entrance gate drive and the exit gate drive can be arranged lengthwise inside the bridge.

A further advantage of a compact structure can be achieved in that the at least one lever of the first gearing and the at least one lever of the second gearing are arranged one above the other inside the bridge.

In a further design the entrance gate drive and the exit gate drive are designed as compressed air cylinders and/or hydraulic cylinders. This enables a compact simple structure.

It is possible that the gearing can be formed not only with one lever, but with several levers to adapt to different torques and installation situations.

Each gearing or each gate drive can have additional stops, more particularly adjustable stops, for fixing the opened and closed positions of the gates. Such stops can also be equipped with electrical or pneumatic or hydraulic switches for switching off the drives in the end positions.

BRIEF DESCRIPTION OF THE DRAWINGS

Further advantages and details are apparent from the exemplary embodiment shown in the figures of the drawings. In the drawings.

DETAILED DESCRIPTION OF THE DRAWINGS

The terms "top", "bottom", "left", "right" relate to the relevant arrangement in the figures.

Figure 1:
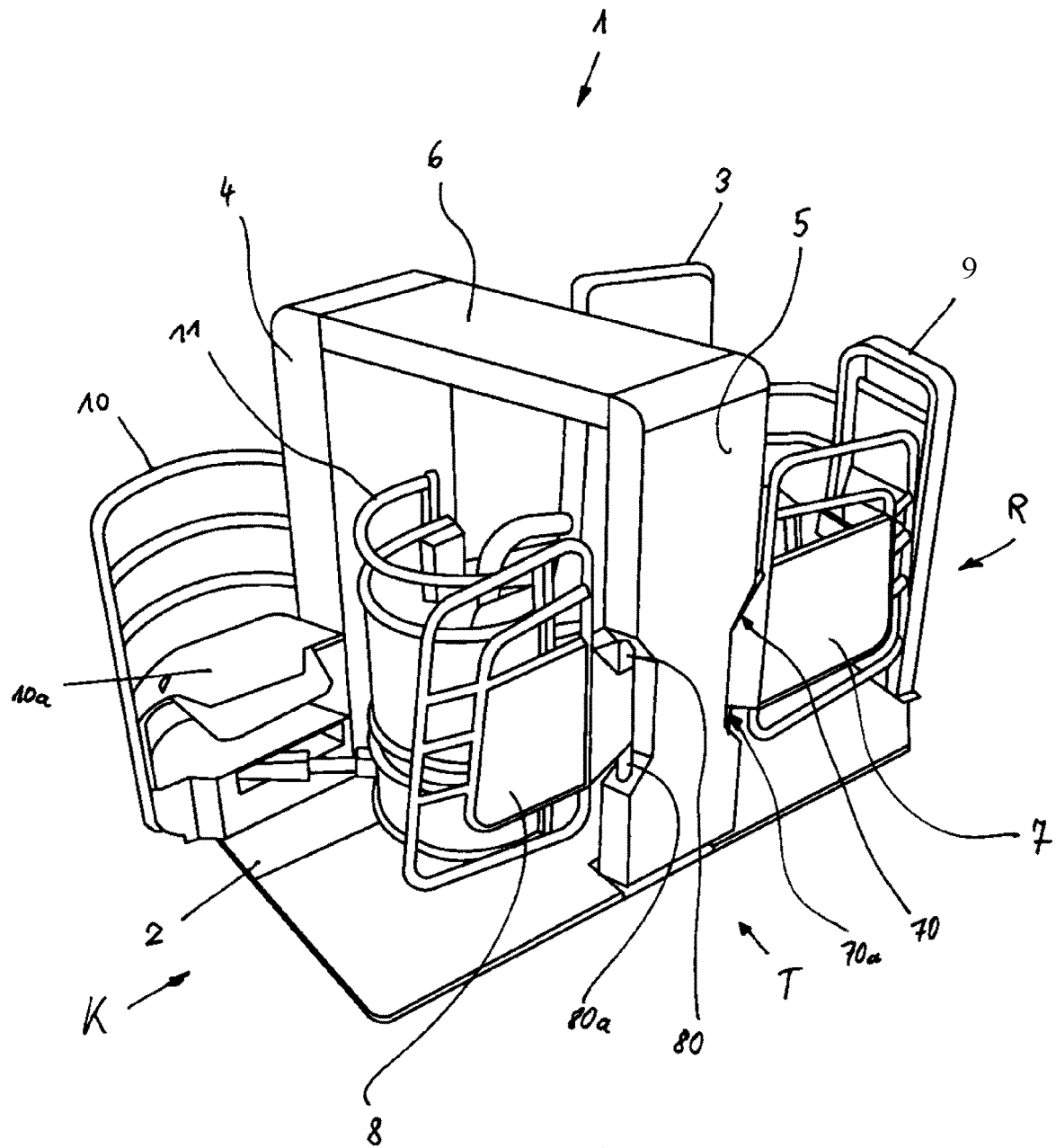
FIGS. 1-2 show diagrammatic perspective views of an exemplary milking parlor.
Figure 2:
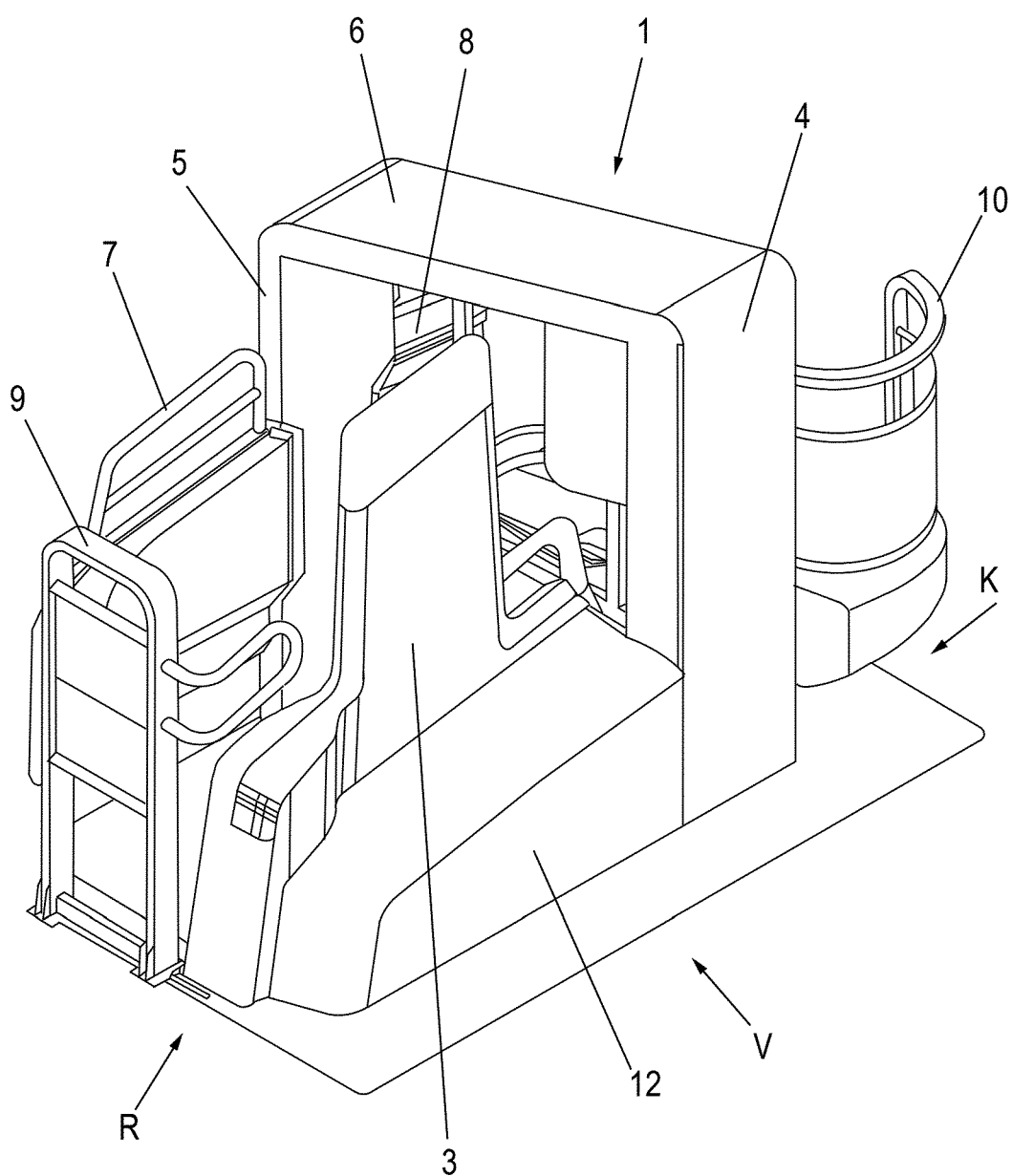
Figure 3:
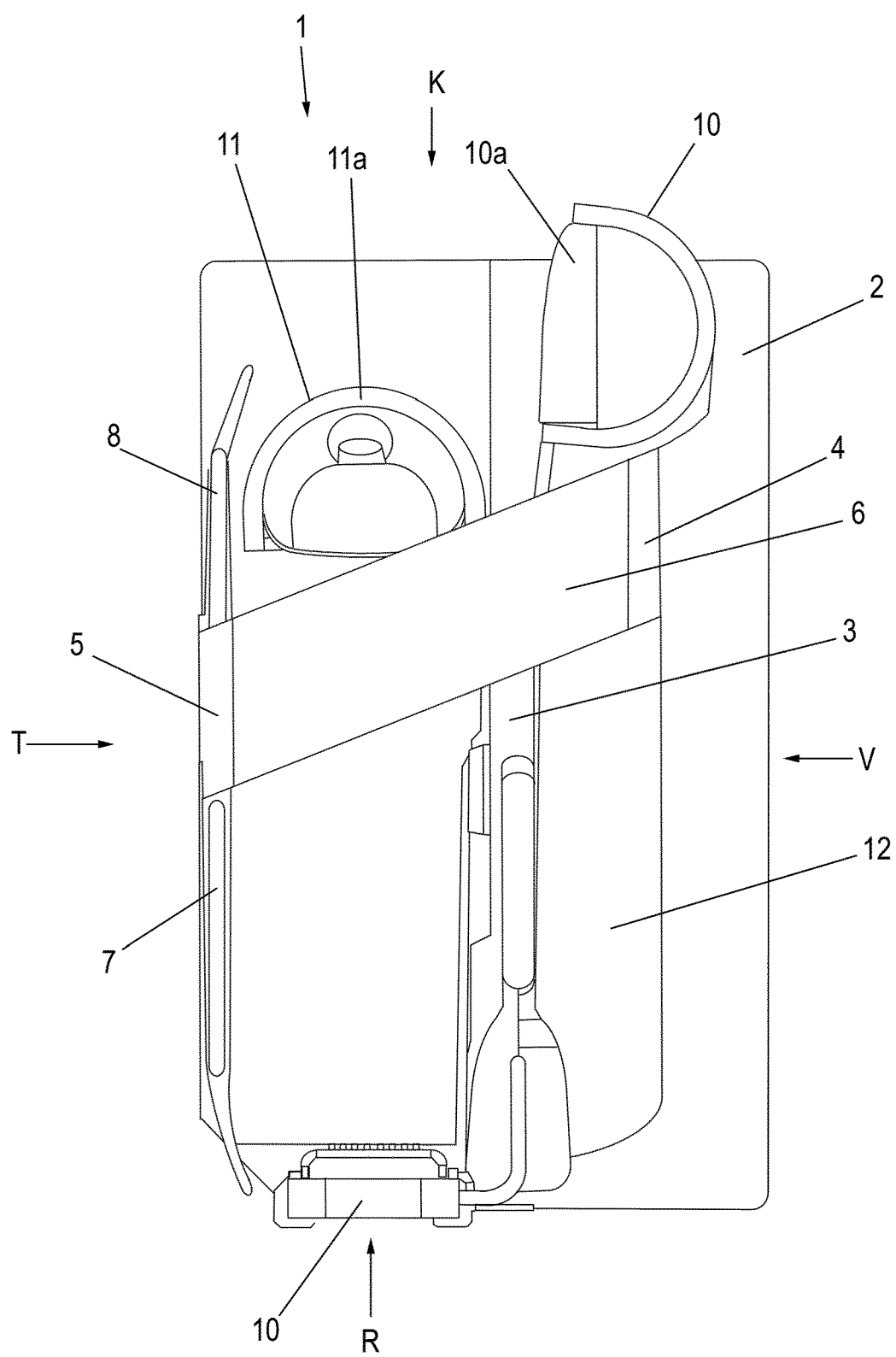
FIG. 3 shows a diagrammatic plan view of the milking parlor according to FIGS. 1 and 2.

FIGS. 1 and 2 show diagrammatic perspective views of an exemplary milking parlor 1. FIG. 1 shows a view from a gate side T wherein FIG. 2 shows a view of an opposite side which is designated here as the power supply side V. FIG. 3 shows a diagrammatic plan view of the milking parlor 1 according to FIGS. 1 and 2.

The milking parlor 1 is formed as a single milking stand with a head side K, a rear side R, a power supply side V and a gate side T. The head side K and the rear side R form the narrow sides of the milking parlor 1 and are opposite one another wherein the power supply side V and the gate side T opposite one another form the longitudinal sides of the milking parlor 1.

The milking parlor 1 comprises a base plate 2, a foot plate 2a, a milking unit 3, a pillar 4, a gate pillar 5, a bridge 6, two milking parlor gates of which one is called an entrance gate 7 and another is called the exit gate 8, a rear grating 9, a front side grating 10, a trough grating 11 and a power supply unit 12 (see FIGS. 2 and 3).

The base plate 2 forms a floor structure of the milking parlor 1 and in part a base for different milking parlor components, such as e.g. the milking unit 3, the pillar 4, the rear grating 9, the front side grating 10 and the power supply unit 12.

The milking unit 3 with the power supply unit 12, the pillar 4 and the front side grating 10 form a boundary for the milking parlor 1 to the power supply side V. The opposite gate side T is defined by the gate pillar 5 and the milking parlor gates 7 and 8 pivotally attached to the gate pillar 5. The entrance gate 7 forms a boundary of the gate side T between the gate pillar 5 and the rear side R. A boundary of the gate side T between the gate pillar 5 and the head side K is formed by the exit gate 8. The rear side R is closed between the entrance gate 7 and the milking unit 3 by the rear grating 10 wherein a boundary is formed by the trough gate 11 on the head side K.

The pillar 4 and the gate pillar 5 are connected at the upper sides by the bridge 6. The bridge 6 runs inclined at an angle of approximately 70° to a longitudinal axis of the milking parlor 1. The gate pillar 5 is arranged approximately in the middle of the gate side T wherein the other pillar 4 is arranged approximately in the front quarter towards the head side K in the region of the supply side V.

An animal to be milked, e.g. a cow, enters the milking parlor 1 through the opened entrance gate 7 from the gate side T. The entrance gate 7 is then closed. The animal then stands in the milking parlor 1 with his head towards the head side of the milking parlor 1 and is then milked by means of a milking robot (not shown) which is housed in the milking unit 3. The animal can then receive fodder in a trough 11a in the trough gate 11. The fodder can be put together individually for each animal and introduced into the trough 11a, e.g. from different storage containers from/to/via the pillar 4. This is not shown here but can be easily envisaged.

After the milking process the exit gate 8 and the trough gate 11 are opened and the animal can leave the milking parlor 1 again via the gate side T and the head side K. When the trough gate 11 is opened it pivots towards the power supply side V to the front side grating 10 so that a cover 10a attached to the side grating 10 covers the trough 11a. The animal is thus not held back further in the milking parlor 1 through any fodder possibly remaining in the trough.

The function and structure of the milking robot, its housing in the milking unit 3 and the structure of the milking unit 3 are described in detail in the document WO 2013/135842 A1, to which reference is made here. The power supply unit 12 serves to supply the milking unit 3 with energy (electricity, compressed air, cleaning fluid etc.) and for discharging the milked milk. The power supply unit 12 furthermore has one or more control devices for the milking robots, gate drives and the like.

FIGS. 4 to 7 show diagrammatic perspective views of the milking parlor gates 7, 8 in different positions. The gate pillar 5 is shown here for clarity without covers or linings. The bridge 6 has a housing 13 whose cover lid is likewise not shown, and a plate-like brace 22. The pillar 4 is not shown in FIGS. 4 to 7.

Figure 4:
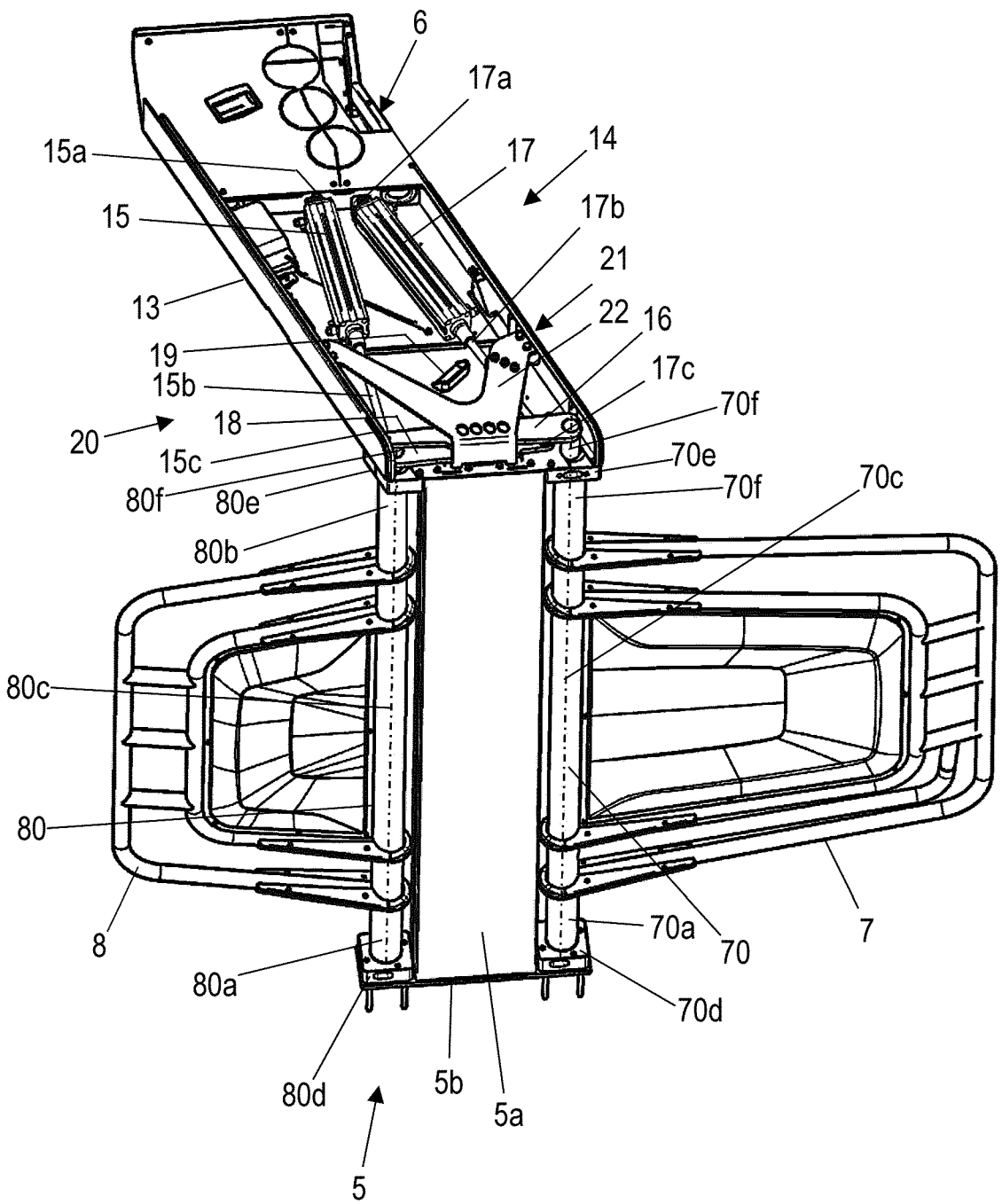
FIGS. 4-7 show diagrammatic perspective views of milking parlor gates in different positions.
Figure 5:
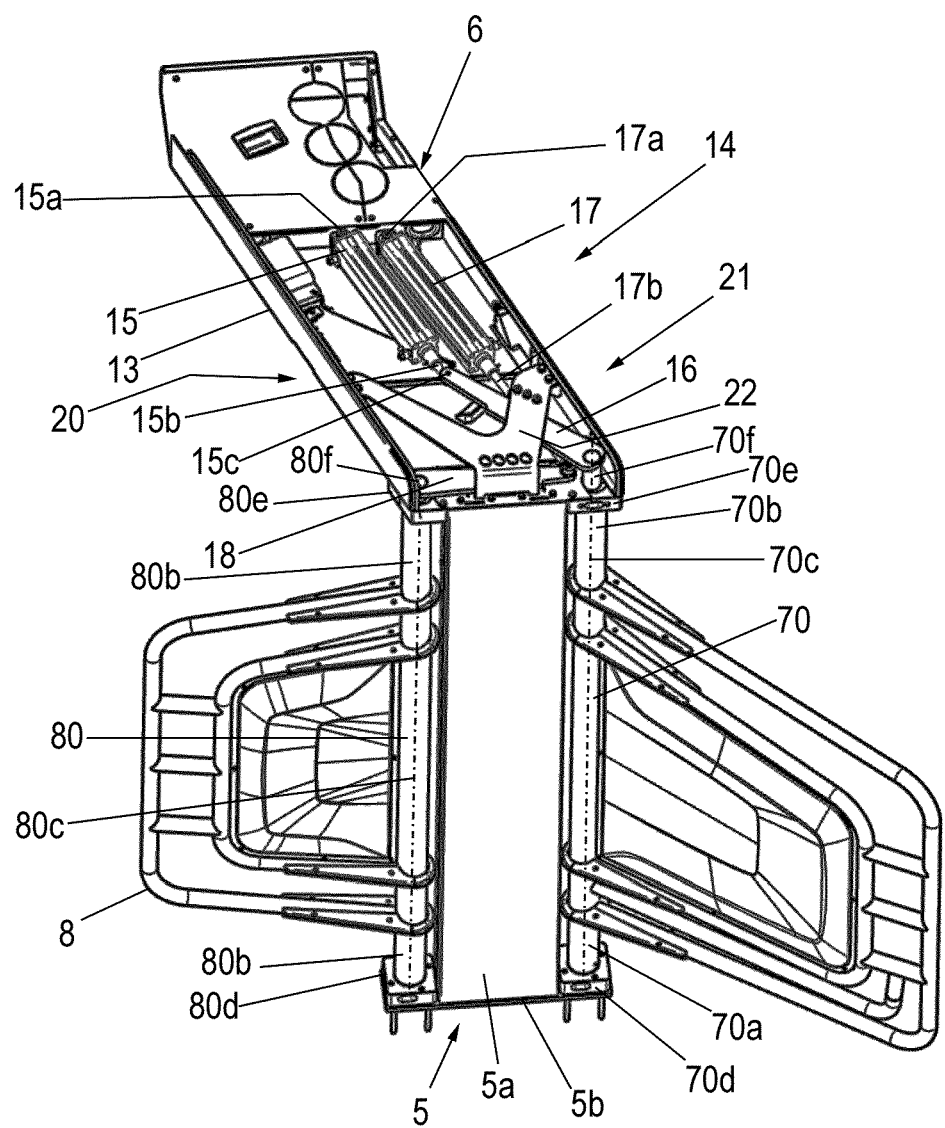
Figure 6:
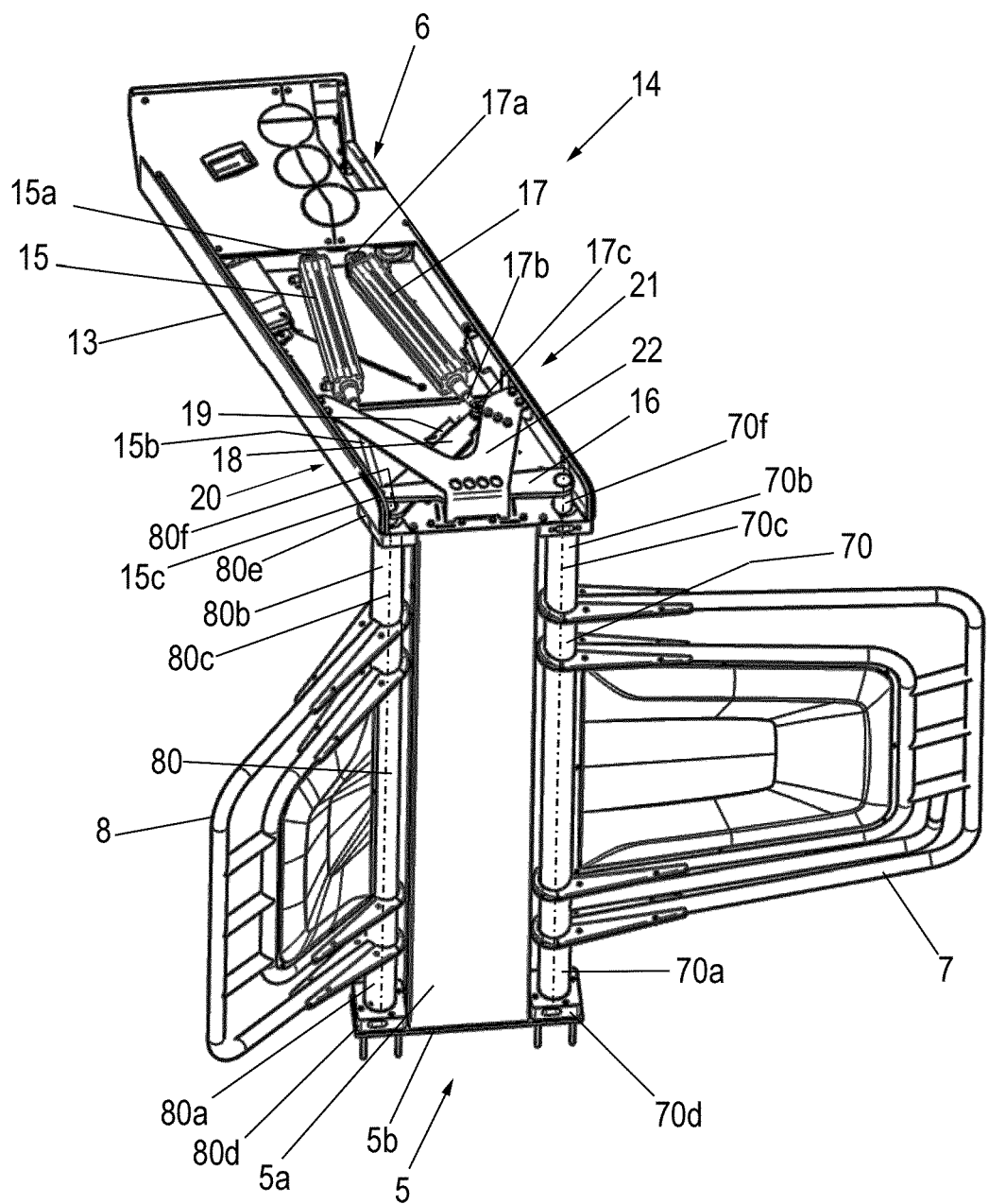
Figure 7:
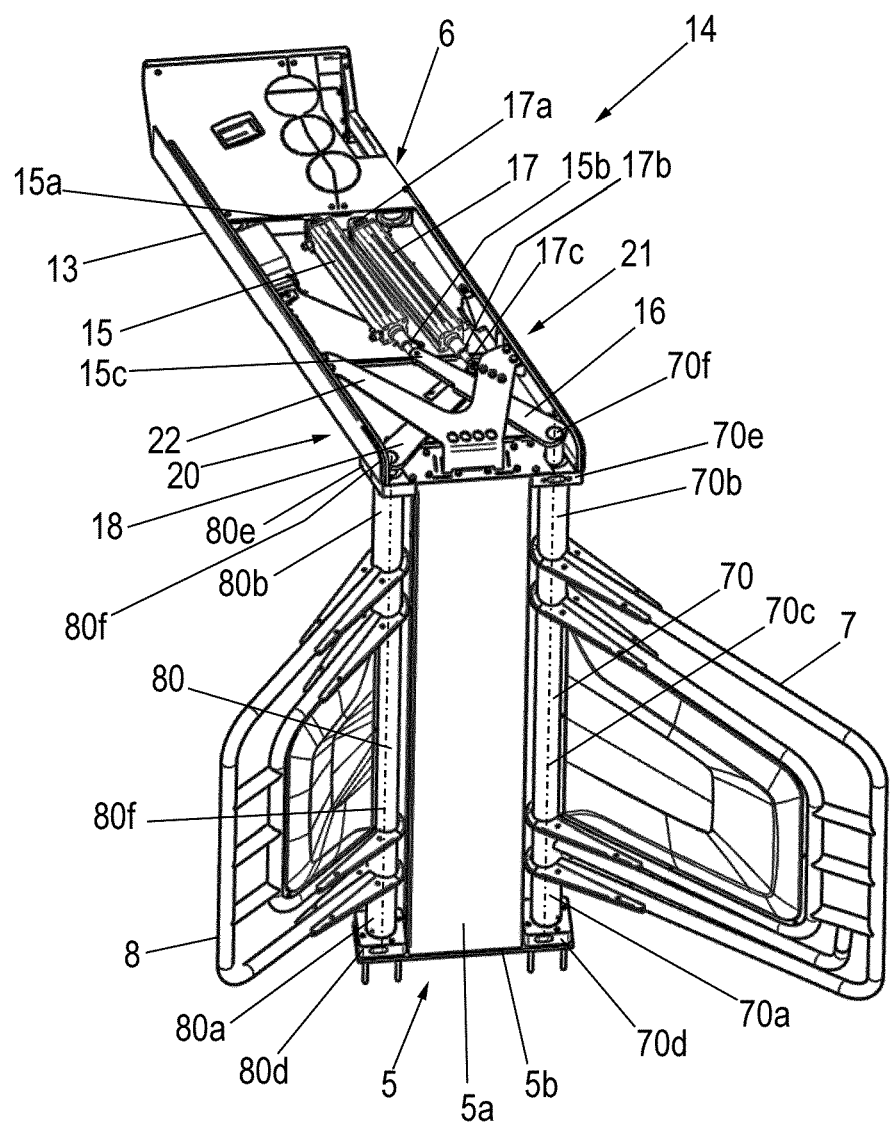

In FIG. 4, the entrance gate 7 and the exit gate 8 are closed. FIG. 5 shows an opened position of the entrance gate 7, and FIG. 6 shows an opened position of the exit gate 8. In FIG. 7 both the entrance gate 7 and also the exit gate 8 are opened.

The gate pillar 5 has a central square support body 5a which is arranged perpendicularly. A width of the support body 5a in a longitudinal direction of the milking parlor 1 is shorter than a width of the bridge 6.

The support body is attached underneath to a base 5b. The base 5b is in turn attached by fastening means, not shown in further detail, on the floor or base plate 2 or a further plate. The upper side of the support body 5a is connected, in a manner likewise not shown in further detail, to the end of the bridge 6 pointing towards the gate side T.

A shaft is mounted on each side of the support body 5a to which the milking parlor gates are attached.

The entrance gate 7 is thus attached to an entrance gate shaft 70. The entrance gate shaft 70 has a lower end with a bearing section 70a and an upper end with a driving section 70b. The entrance gate shaft 70 is mounted vertically on the right vertical side of the support body 5a shown in FIGS. 4-7 and has an entrance gate axis 70c about which it can rotate in bearings 70d and 70e. The bearing 70d is attached next to the support body 5a on the base 5b, and the other bearing 70e is attached to the underneath side of the housing 13 of the bridge 6 next to the attachment of the housing 13 on the upper side of the support body 5a.

The exit gate 8 is connected to an exit gate shaft 80 in a similar manner. The exit gate shaft 80 also has a lower end with a bearing section 80a and an upper end with a driving section 80b. The exit gate shaft 80 is attached on the other vertical side of the support body 5a like the entrance gate shaft 7 in bearings 80d and 80e to rotate about an exit gate axis 80c of the exit gate shaft 80.

The relevant upper end of the driving section 70b of the entrance gate shaft 70 and the driving section 80b of the exit gate shaft 80 extend through the relevant bearings 70e and 80e upwards and each protrude as a driving end 70f and 80f into the inside of the housing 13 of the bridge 6.

A driving assembly 14 is installed in the bridge 6 and is provided to pivot the entrance gate 7 and the exit gate 8. With the driving assembly 14 it is possible to pivot the entrance gate 7 and exit gate 8 individually. In other words, the entrance gate 7 and the exit gate 8 can be opened and closed independently of one another. These different positions are shown in FIGS. 4-7.

The driving assembly 14 comprises in this exemplary embodiment an entrance gate drive 15 with a gearing 20 and an exit gate drive 17 with a gearing 21.

The entrance gate drive 15 and the exit gate drive 17 are formed here as compressed air cylinders and are arranged lengthwise in the bridge 6 in the housing 13. The entrance gate drive 15 is attached for pivotal movement via a bearing 15*a* in the housing 13 of the bridge 6. One end of its piston rod 15*b* is coupled to the associated gearing 20. In the same way the exit gate drive 17 is attached via a bearing 17*a* in the housing 13 of the bridge 6, wherein one end of the piston rod 17*b* of the exit gate drive 17 is coupled to the associated gearing 21.

The gearings 20 and 21 are formed here as lever gearings. The gearing 20 comprises a lever 16 which is coupled for pivotal movement by one end to the end of the piston rod 15*b* of the entrance gate drive 15 in an output bearing 15*c*. The other end of the lever 16 is connected secured against rotation to the drive end 70*f* of the entrance gate shaft 70. The other gearing 21 comprises also a lever 18 in a similar way. The one end of the lever 18 is coupled for pivotal movement to the end of the piston rod 17*b* of the exit gate drive 17 in an output bearing 17*c*, and the other end of the lever 18 is connected secured against rotation to the drive end 80*f* of the exit gate shaft 80.

In this exemplary embodiment the levers 16 and 18 are arranged one above the other. In the closed positions of both gates 7, 8 shown in FIG. 4, the two levers 16, 18 are substantially parallel to the wide side of the bridge 6. Each lever 16, 18 is aligned approximately with the associated gate 7, 8 so that each lever 16, 18 faces in an opposite direction of the associated gate 7, 8. The entrance gate 7 thus in FIG. 4 faces to the right parallel to the longitudinal side of the gate side T of the milking parlor 1, wherein the associated lever 16 runs to the left. In the case of the exit gate 8 the situation is reversed.

In the positions of the entrance gate 7 and of the exit gate 8 shown in FIG. 4 the piston rod 15*b* of the entrance gate drive 15 and the piston rod 17*b* of the exit gate drive 17 are extended.

When the entrance gate 7 is opened (FIG. 5) the piston rod 15*b* of the entrance gate drive 15 is retracted and the lever 16 pivots with the entrance gate 7 about the entrance gate axis 70*c* clockwise as seen from above. In this position the lever 16 can bear against a stop (not shown) through which the opened position of the entrance gate 7 can be fixed. This stop (not shown) can be attached for example to the underneath of the plate-like brace 22.

FIG. 6 shows the position of the opened exit gate 8. The piston rod 17*b* of the exit gate drive 17 is retracted. The lever 18 is pivoted with the exit gate 8 anti-clockwise about the exit gate axis 80*c* as seen from above. In this position the lever 18 bears against a stop 19. The stop 19 can fix the opened position of the entrance gate 8.

It is also possible that both the entrance gate 7 and also the exit gate 8 are opened, as shown in FIG. 7. This situation can exist for example in the case when a cow has already left the milking parlor 1 and the next cow is coming into the milking parlor 1.

The driving assembly 14 is in the bridge 16 at a place above the milking parlor 1 and above an animal located in the milking parlor 1 for milking. All the components which are required to pivot the gates 7, 8, including the driving assembly 14, are thus located out of reach of the animal being milked. The risk of injury to the animal being milked is thus considerably reduced. At the same time the possibility of damaging the driving assembly 14 with the associated components, e.g. through steps by the animal being milked, is considerably reduced since the animal to be milked cannot reach them.

Controlling the driving assembly 14 can be carried out by way of example in the case of compressed air cylinders via valves which are also located in the bridge 6. These valves can be controlled by control air via control valves in the supply unit.

The exemplary embodiment described above does not restrict the invention but the latter can be modified within the scope of the accompanying claims.

It is thus conceivable for example that the stop 19 of the lever 18 and the stop (not shown) of the lever 16 also have electrical or pneumatic switch elements which automatically switch off the respective drive 15, 17 in the respective end position.

Instead of compressed air cylinders it is also possible to provide hydraulic cylinders or electric motorized adjustment drives with threaded spindles and nuts.

It is also conceivable that the gearings 20, 21 can have other types of gearings instead of levers 16, 18, for example gearwheel gears. A toothed rack gearing is also possible.

A further possibility exists where the gearings 20, 21 comprise several levers 16, 18.

The invention claimed is:

1. A milking parlor for milking dairy animals, comprising:
   a pillar;
   a gate pillar;
   a pivoting entrance gate operatively joined to the gate pillar;
   a pivoting exit gate operatively joined to the gate pillar;
   a bridge mounted on the pillar and the gate pillar; and
   a driving assembly mounted at least partially inside the bridge and coupled to the entrance gate and the exit gate, and including:
      an entrance gate drive; and
      an exit gate drive.

2. The milking parlor of claim 1, and further comprising:
   a first gearing coupled between the entrance gate and the entrance gate drive; and
   a second gearing coupled between the exit gate and the exit gate drive.

3. The milking parlor of claim 2, wherein the first gearing comprises a lever, and the second gearing comprises a lever.

4. The milking parlor of claim 3, wherein the entrance gate is substantially secured against rotation to a vertically mounted entrance gate shaft, and the exit gate is substantially secured against rotation to a vertically mounted exit gate shaft.

5. The milking parlor of claim 4, wherein the entrance gate shaft is secured against rotation to the lever of the first gearing, and the exit gate shaft is secured against rotation to the lever of the second gearing.

6. The milking parlor of claim 5, wherein the entrance gate shaft is mounted on a vertical longitudinal side of a support body of the gate pillar, and the exit gate shaft is mounted on another vertical longitudinal side of the support body of the gate pillar.

7. The milking parlor of claim 6, wherein the entrance gate drive and the exit gate drive are mounted lengthwise at least partially inside the bridge.

8. The milking parlor of claim 7, wherein the lever of the first gearing and the lever of the second gearing are arranged one above the other at least partially inside the bridge.

9. The milking parlor of claim 1, wherein the entrance gate drive and the exit gate drive each comprise:
   a compressed air cylinder.

10. The milking parlor of claim 1, wherein the milking parlor is an automated dairy animal milking parlor.

11. The milking parlor of claim 1, wherein the entrance gate drive and the exit gate drive each comprise:
 a hydraulic cylinder.

\* \* \* \* \*